No. 816,448. PATENTED MAR. 27, 1906.
H. O. FISHER.
APPARATUS FOR TREATING LIQUIDS.
APPLICATION FILED OCT. 6, 1905.
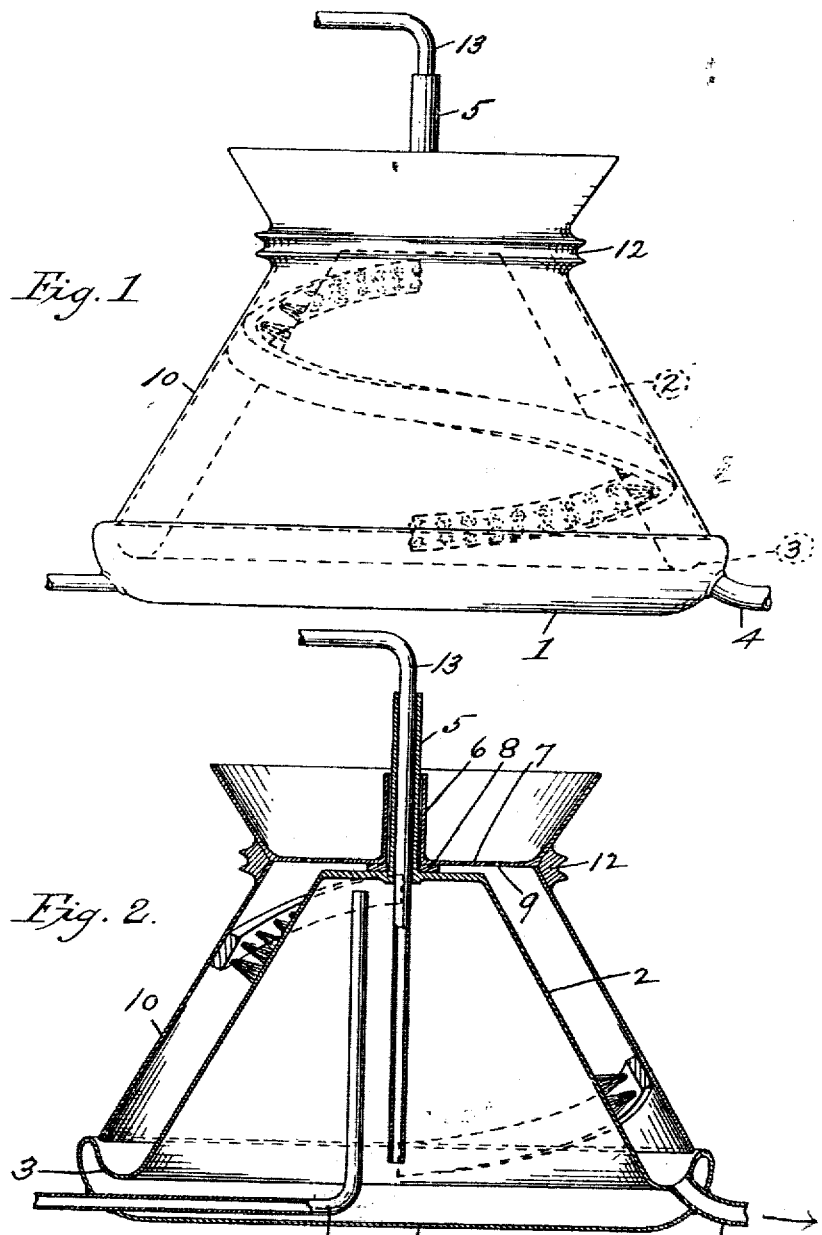
Witnesses:
A. L. Lord.
J. B. Hull
Inventor
Homer O. Fisher,
by Buford W. Brockett.
Attorney.

PATENT OFFICE.

HOMER O. FISHER, OF CLEVELAND, OHIO.

APPARATUS FOR TREATING LIQUIDS.

No. 816,448.　　　Specification of Letters Patent.　　　Patented March 27, 1906.

Application filed October 6, 1905. Serial No. 281,588.

*To all whom it may concern:*

Be it known that I, HOMER O. FISHER, residing at Cleveland, in the county of Cuyahoga and State of Ohio, have invented certain new and useful Improvements in Apparatus for Treating Liquids, of which the following is a full, clear, and exact description, reference being had to the accompanying drawings.

The invention relates to apparatus for treating liquids, particularly milk, and contemplates the use of a device which will separate the liquid into small streams and subject the same to the required heating or cooling medium.

More specifically the invention relates to an apparatus comprising a receiver for containing the heating or cooling medium and having a large exposed surface upon which the liquid to be treated is directed, whereby it will be affected by the heating or cooling medium and will be brought to the required temperature.

The invention may be further briefly summarized as consisting in the construction and combination of parts hereinafter set forth in the following description, drawings, and claims.

Referring to the drawings, Figure 1 is a side elevation of a device constructed according to my invention, and Fig. 2 is a vertical sectional view through the center of the same.

Any suitable form and construction of parts may be employed in the carrying out of my invention; but I have shown one form in the drawings which very effectively meets the necessary requirements, and in such embodiment 1 represents the base of substantial saucer shape, as shown, and having within the same a frusto-conical-shaped casing 2, which is directly connected to the base in a manner such that a trough 3 is formed at the edge thereof for collecting the liquid as it is permitted to flow down the surface of the conical-shaped casing 2. A tube 4 leads from this trough for conveying the liquid away.

Mounted rigidly in the top of the conical-shaped casing 2 is a hollow shaft 5, communicating with the inside of the same. Rotatably mounted upon the hollow shaft 5 a sleeve 6 is provided, and it has rigid with it a reservoir 7, bearing upon a suitable ring 8. This reservoir has perforations 9 arranged in a circle and adapted to supply the liquid within the reservoir to the upper portion of the surface of the conical casing. The reservoir 7 is provided with an apron 10, extending downward to a point near the edge of the base 1, whereby any heated or cooled air which may be present in the chamber between it and the conical-shaped casing 2 will be brought to bear upon the liquid flowing down the same. This apron is frusto-conical in shape for the purpose of conforming to the configuration of the conical-shaped casing 2. Secured upon the inner wall of the apron 10, as shown, a spiral brush 11 is arranged to take against the surface of the conical-shaped casing 2 for the purpose of preventing the collection of any particles from the liquid treated. A pulley 12 may be provided upon the reservoir 7 and its apron 10 for rotating the same.

The apparatus is further provided with a steam-pipe 13, passing down through the hollow shaft 5 and extending to a point near the bottom of the chamber formed by the conical casing 2 and the base 1, and with an overflow-pipe 14, which enters at the base and extends upward to a point near the top of the conical casing 2. Live steam is permitted to flow into the chamber between the conical casing and the base and to either heat the same directly or to flow into water therein and to raise the temperature thereof to the required point. Then the liquid to be treated is supplied to the reservoir 7, from whence it flows in small streams down the surface of the conical casing, where it is heated to the proper temperature, and into the trough 3, which directs it out through the tube 4.

Having described my invention, I claim—

1. In apparatus for treating liquids, in combination, a chamber provided with a medium for varying the temperature thereof, means for supplying the liquid to be treated to the surface of the casing of said chamber, and means contacting with said surface for preventing the collection of particles of substance upon the same.

2. In apparatus for treating liquids, in combination, a chamber provided with means for varying the temperature thereof, means for supplying the liquid to be treated to the surface of the casing of said chamber, and rotary means contacting with said surface for preventing the collection of particles upon the same.

3. In apparatus for treating liquids, in combination, a surface over which the liquid to be treated is adapted to flow, means for varying the temperature of said surface, and means contacting with the same for preventing the collection of particles thereon.

4. In apparatus for treating liquids, in combination, an inclined surface over which the liquid to be treated is adapted to flow, means for varying the temperature of said surface, and means contacting with said surface for preventing the collection of particles of substance upon the same.

5. In apparatus for treating liquids, in combination, a conical-shaped surface down which the liquid to be treated is adapted to flow, means for varying the temperature of the same, and means contacting with said surface for preventing the collection of particles of substance upon said surface.

6. In apparatus for treating liquids, in combination, a conical casing adapted to receive a stream of the liquid to be treated upon its inclined surface, and a rotary reservoir mounted upon said casing and adapted to deliver the liquid to be treated to the inclined surface of said casing.

7. In apparatus for treating liquids, in combination, a conical-shaped casing adapted to receive small streams of the liquid to be treated upon its inclined surface, a rotary reservoir mounted upon said casing and provided with means for delivering small streams of the liquid to be treated to the upper part of said surface, and means for varying the temperature of the surface of said casing.

8. In apparatus for treating liquids, in combination a conical-shaped casing adapted to receive the liquid to be treated upon its inclined surface, means engaging said surface to prevent the collection of particles of substance upon the same, a reservoir mounted upon said casing and adapted to deliver the liquid to be treated to the inclined surface of said casing, and means for varying the temperature of said surface.

9. In apparatus for treating liquids, in combination, a frusto-conical-shaped casing adapted to receive the liquid to be treated upon its inclined surface, a brush engaging such surface to prevent the collection of particles of substance upon said surface, a reservoir mounted to deliver the liquid in small streams to said surface, means for shifting said brush upon said surface, and means for varying the temperature of said surface.

10. In apparatus for treating liquids, in combination a frusto-conical casing adapted to form a chamber for receiving the medium for varying the temperature of the liquid to be treated, a brush spirally arranged and adapted to engage the surface of said conical casing, means for rotating said brush, a reservoir mounted upon said conical casing and adapted to deliver small streams of the liquid to be treated to the surface of said casing, and means for supplying a medium to said surface for varying the temperature of the liquid.

11. In apparatus for treating liquids, the combination with the base, of a frusto-conical casing mounted therein and adapted to receive the liquid to be treated upon its inclined surface, a reservoir mounted upon said casing and provided with perforations for supplying small streams of the liquid to be treated to the surface of said casing, a brush carried by said reservoir and adapted to engage the surface of said conical casing, means for rotating said reservoir and said brush, and means for supplying a medium to said surface to vary the temperature thereof.

In testimony whereof I affix my signature in the presence of two witnesses.

HOMER O. FISHER.

Witnesses:
J. B. HULL,
B. W. BROCKETT.